United States Patent
Basile et al.

(10) Patent No.: US 9,422,855 B2
(45) Date of Patent: Aug. 23, 2016

(54) SHUTTLE VALVE ASSEMBLY AND METHOD FOR INTERCOOLER CONDENSATION REMOVAL

(71) Applicant: Ford Global Technologies, LLC, Dearborn, MI (US)

(72) Inventors: James M. Basile, Dundee, MI (US); Joseph Skrobowski, New Boston, MI (US); Scott Willis, Gibraltar, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 14/104,971

(22) Filed: Dec. 12, 2013

(65) Prior Publication Data
US 2015/0167539 A1  Jun. 18, 2015

(51) Int. Cl.
*F02B 29/04* (2006.01)

(52) U.S. Cl.
CPC .......... *F02B 29/0468* (2013.01); *Y02T 10/146* (2013.01); *Y10T 137/0379* (2015.04); *Y10T 137/7922* (2015.04)

(58) Field of Classification Search
CPC .......... F02B 29/0468; F02B 29/0475; F02M 25/074; F02M 25/0735; B60H 1/3233; F01P 2060/02; F24F 13/22
USPC ........ 123/563, 41.21, 184.53, 559.1; 60/599, 60/611, 615; 137/187–190, 268, 535, 526, 137/177; 251/344
See application file for complete search history.

(56) References Cited

U.S. PATENT DOCUMENTS

| | | | | |
|---|---|---|---|---|
| 4,280,524 A | * | 7/1981 | Beimgraben | 137/268 |
| 5,363,519 A | * | 11/1994 | Husting | E03C 1/23 251/129.15 |
| 5,555,856 A | * | 9/1996 | Bauer et al. | 123/41.42 |
| 6,301,887 B1 | * | 10/2001 | Gorel et al. | 60/605.2 |
| 7,251,937 B2 | | 8/2007 | Appleton | |
| 8,371,119 B2 | | 2/2013 | Durand et al. | |
| 2008/0302327 A1 | * | 12/2008 | Dahl et al. | 123/184.53 |
| 2009/0173678 A1 | * | 7/2009 | Lysne | C01D 3/00 210/170.11 |
| 2011/0253098 A1 | * | 10/2011 | Pursifull et al. | 123/336 |

(Continued)

FOREIGN PATENT DOCUMENTS

EP   2161430 A1   3/2010

OTHER PUBLICATIONS

Pursifull, Ross D., "Method for Purging Charge Air Cooler Condensate During a Compressor Bypass Valve Event," U.S. Appl. No. 13/852,950, filed Mar. 28, 2013, 35 pages.

(Continued)

*Primary Examiner* — Thomas Denion
*Assistant Examiner* — Thomas Olszewski
(74) *Attorney, Agent, or Firm* — Greg Brown; Alleman Hall McCoy Russell & Tuttle LLP

(57) ABSTRACT

Methods and systems are provided for removing condensate from an intercooler of a turbocharged internal combustion engine. Using valves to drain condensate may create a direct fluidic connection between the compressed air of the intercooler and ambient exterior air, allowing both condensate and compressed air to escape due to valve design or failure of valve actuation devices. To provide a simple and reliable method for removing condensate without removing compressed air, a hollow valve is used to shuttle condensate from the intercooler to the exterior environment.

19 Claims, 6 Drawing Sheets

(56) References Cited

U.S. PATENT DOCUMENTS

| | | | |
|---|---|---|---|
| 2011/0253111 A1* | 10/2011 | Pursifull | 123/559.1 |
| 2012/0055151 A1* | 3/2012 | Durand | F01M 1/00 60/599 |
| 2013/0067913 A1 | 3/2013 | Nishio et al. | |

OTHER PUBLICATIONS

Kuske, Andreas et al., "Method for Discharging Condensate From a Turbocharger Arrangement," U.S. Appl. No. 13/949,054, filed Jul. 23, 2013, 39 pages.

* cited by examiner

SHUTTLE VALVE ASSEMBLY AND METHOD FOR INTERCOOLER CONDENSATION REMOVAL

FIELD

The present application relates to the design and method of operation of a shuttle valve for condensation removal from the intercooler of a turbocharged internal combustion engine.

SUMMARY/BACKGROUND

Turbocharged and supercharged internal combustion engines may be configured to compress ambient air in order to increase power. Compressing the ambient air may cause an increase in air temperature, causing a decrease in engine power due to the intake of high-temperature air. To decrease the ambient air temperature an intercooler (or charge air cooler, CAC) may be placed in between the compressor and intake manifold. By reducing the temperature of the ambient air, its density increases thereby allowing the engine to produce more power. However, as the hot air passes through the intercooler and cools off below the water dew point, condensate (in the form of liquid water mixed with other particulates or fluids) may form and collect inside the intercooler and its passages. Condensation levels may also increase due to increased humidity or rainy weather conditions, where the ambient air is holding an increased amount of water. When engine torque is increased during acceleration or other similar conditions, the resulting increased mass airflow may draw the condensate from the intercooler into the engine, thus increasing the chance of engine misfire and combustion instability.

One method to address the issue of condensate formation in the intercooler involves draining condensate from the intercooler via a removal valve. Many types of valves and valve systems exist for purging the intercooler of condensate. However, one major problem that arises from using removal valves is that during valve opening events a direct fluidic connection between the interior of the intercooler and an outside forms, thereby allowing both condensate and compressed air to escape. The loss of compressed air may decrease boost pressure to the engine and cause miscalculations in the amount of intake air, thereby reducing engine performance.

In one approach to avoid direct connection between the boosted air and the outside environment, shown by Appleton in U.S. Pat. No. 7,251,937, two valves and a water reservoir are used to drain condensate from the CAC. A check valve leads from the CAC to a water reservoir and a pilot operated valve leads from the water reservoir to the environment. Depending on the pressure within the CAC the two valves open and close, utilizing springs and a pilot line to ensure that the valves are neither both opened or closed at the same time so the CAC is always isolated from the environment. The condensate draining system operates in a number of states depending on the CAC pressure, wherein condensate drains from the CAC to the reservoir via the check valve and from the reservoir to the environment via the pilot operated valve. Additionally, during periods of constant pressure in the CAC, the number of states may not cycle resulting in the check valve remaining closed and condensate accumulating in the CAC.

However, the inventors herein have identified potential issues with the approach of U.S. Pat. No. 7,251,937. If the valve springs were to malfunction or the opening and closing states were mistimed a direct fluidic connection between the CAC and environment would form, leading to the aforementioned results. Furthermore, the use of multiple valves unnecessarily increases the complexity of the draining system.

Thus in one example, the above issues may be addressed by a method for condensate removal comprising: collecting condensate from an intercooler into a collection region; moving the condensate through an orifice into a cavity of a hollow valve in a first position; and shuttling the valve to a second position to release the condensate to an exterior side of the intercooler. In this way, boosted air from the intercooler cannot continuously escape to the exterior atmosphere while still being able to effectively drain condensate from the intercooler.

For example, the valve assembly used to move the condensate from the interior to exterior of the intercooler may include a condensate collection region (e.g. container) and a hollow valve. The collection region allows condensate to flow into the hollow valve via an orifice, with the hollow valve in a first or closed position. Upon a boosted air pressure within the intercooler the valve may move to the exterior of the intercooler in a second or open position such that the condensate can drain to the exterior environment via the same orifice. The hollow valve may then move back to the closed position. As the hollow valve moves back and forth in a shuttling manner, condensate is continuously removed from the intercooler without forming a direct connection between the compressed air and atmospheric air. The shuttling motion of the valve depends on the pressure fluctuations within the intercooler.

For times when there is no substantial air pressure change within the intercooler, an electric actuator may be attached to the valve such that it operates when the mechanical pressure activation of the valve temporarily stops. A control scheme may be implemented such that a timer measures the duration of a constant pressure event and if a pre-determined time elapses such that the pressure does not substantially change, then a controller signals the actuator to shuttle the valve for a period of time or number of cycles.

In addition to the electronic actuator, the valve assembly may be equipped with a heating element that is utilized during cold weather situations. The heater may be located on a surface of the valve assembly such that it is near the liquid condensate in the collection container and hollow valve. During cold weather the heater would keep the condensate above freezing temperatures allowing for the continuous removal of condensate from the intercooler.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
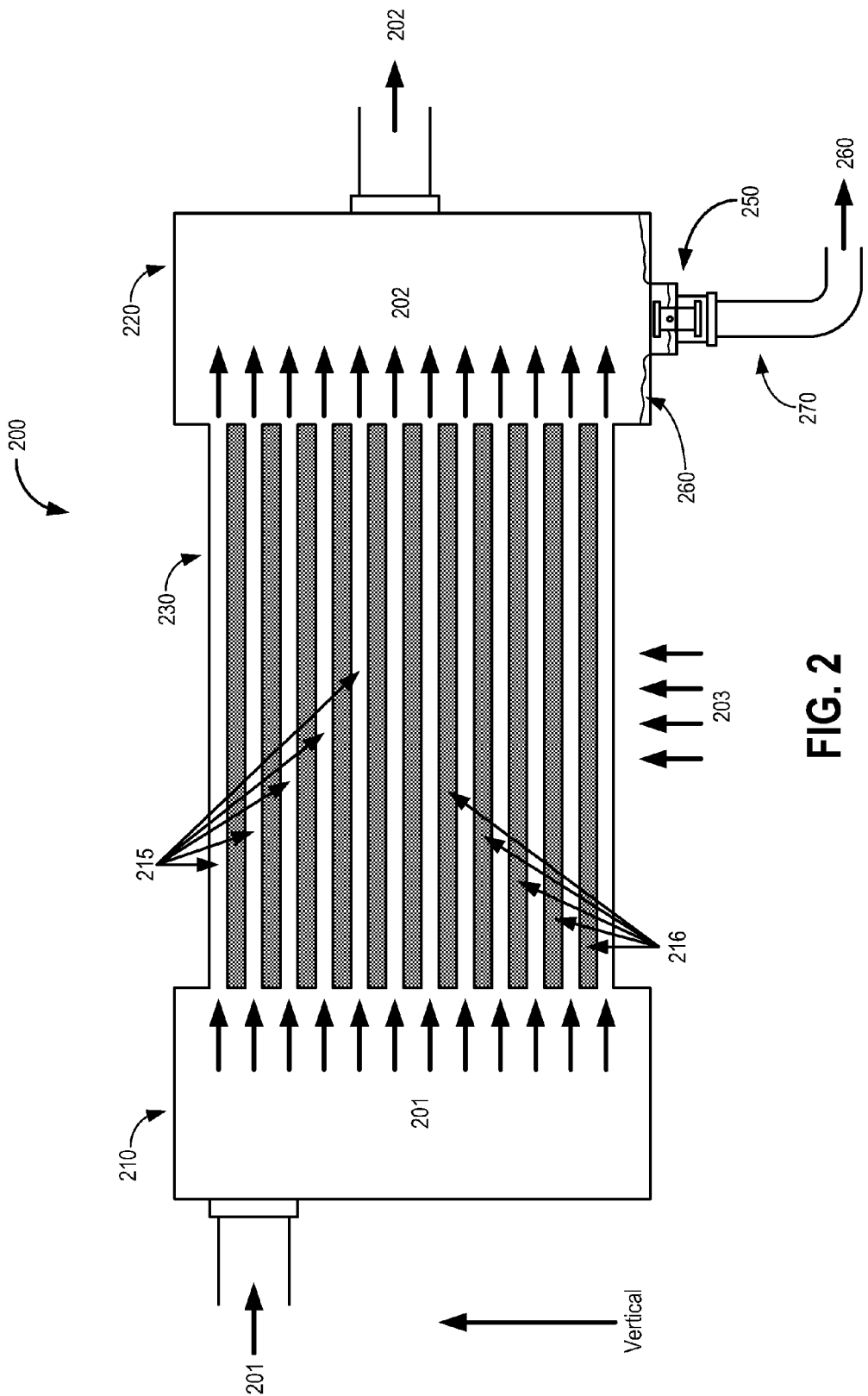
FIG. 2 is a detailed view of the intercooler with the attached valve assembly.
Figure 3:
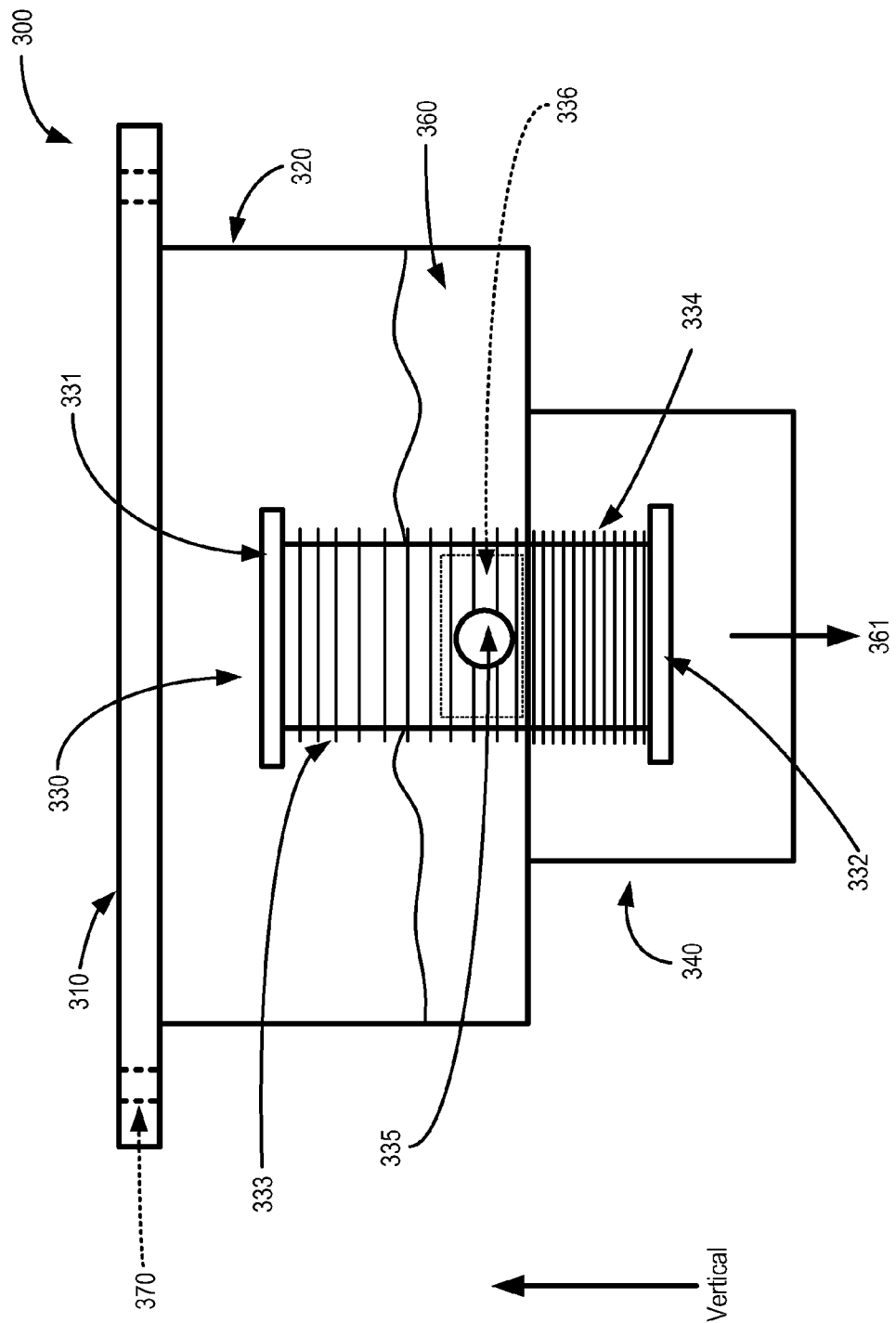
FIG. 3 is a side view of the valve assembly.

The following description provides methods and systems for removing condensation from the intercooler of an internal combustion engine. The method is implemented in an engine system such as the engine system of FIG. 1. The compressor of the turbocharger may provide hot, compressed air to an intercooler, which in turn cools the air and may create condensate. A valve assembly may be inserted in the bottom of the intercooler, as shown in FIG. 2. The valve assembly operates to remove condensate from the intercooler such that there is never direct fluidic communication between compressed air in the intercooler and the exterior ambient air. Such operation reduces leakage of fresh airflow. In one example, the valve can be only open or closed, and nowhere in between, thus avoiding continual leakage. FIG. 3 illustrates a number of mechanical components of the valve assembly that allow the hollow valve to collect condensate and move. The movement of the hollow valve is restricted to a linear motion such that the valve shuttles back and forth between an open and closed position based on the air pressure within the intercooler. The shuttling motion of the valve due to boosted or non-boosted air pressure is displayed in FIG. 4. As the intercooler air pressure varies the valve opens and closes, shuttling an amount of condensation from the intercooler, seen in graphical form in FIG. 5. During periods of sustained throttling or idling where the intercooler pressure does not substantially vary, an electronic actuator may shuttle the valve according to a control scheme shown in FIG. 6. The hollow valve thus fills with condensate via one or more holes when closed, and then drains only the condensate that filled (or partially filled) the hollow valve when open, again through the same one or more holes.

Regarding terminology in the following description, an intercooler may be interchangeably referred to as a charge air cooler (CAC). The valve assembly refers to all the components of the valve assembly, including the hollow valve itself. The hollow valve may also be referred to as the shuttle valve due to the motion between its open and closed positions, or simply as the valve. If the engine is experiencing light to heavy throttling the air within the intercooler may be referred to as being in a boosted pressure state. Conversely, if the engine is experiencing idling the air within the intercooler may be referred to as being in a non-boosted pressure state. The compressed air that flows through the intercooler may also be referred to as charge air or boosted air.

Figure 1:
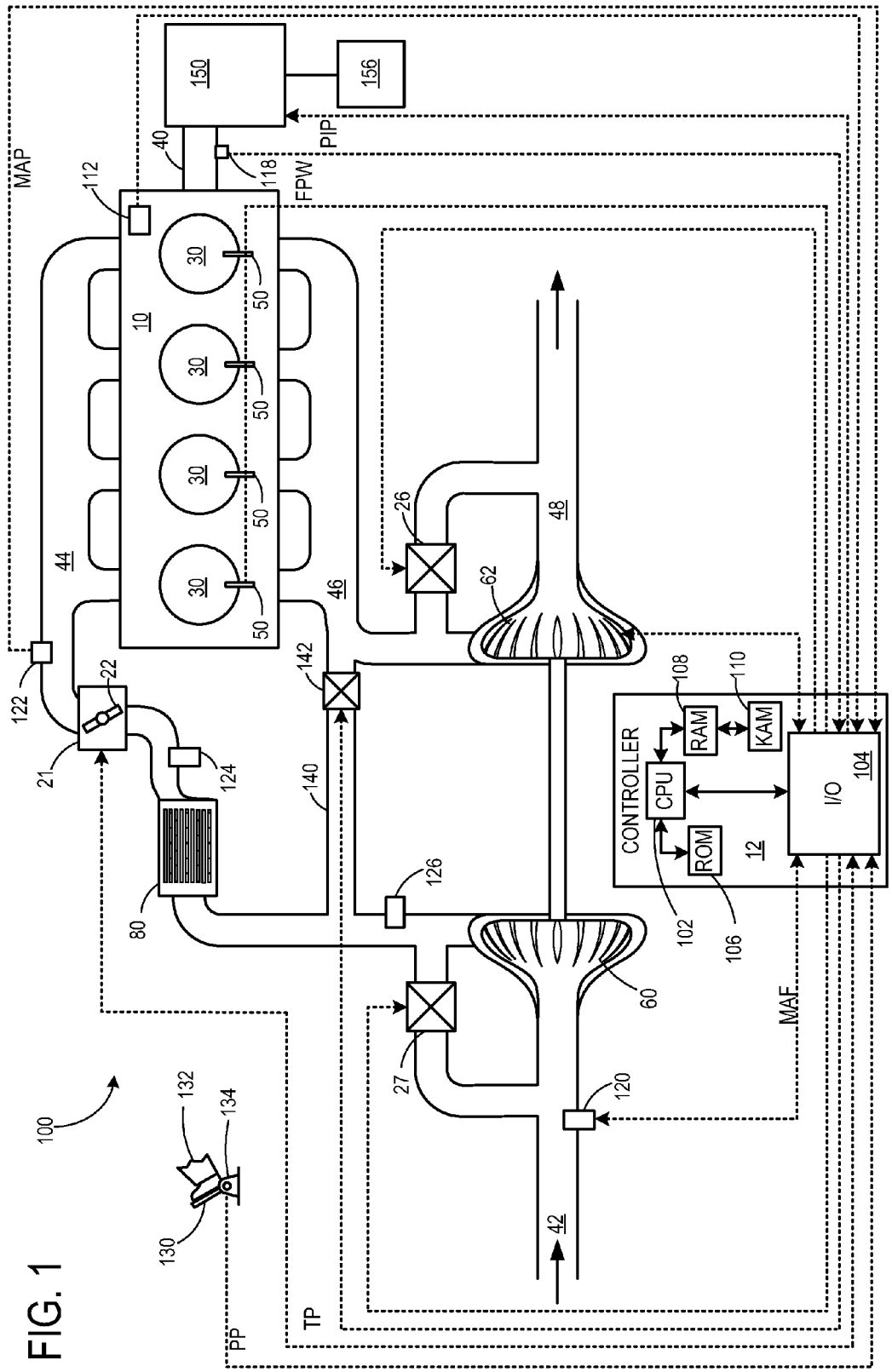
FIG. 1 is a schematic diagram of an example engine system including an intercooler.

FIG. 1 is a schematic diagram showing an example engine system 100, including an engine 10, which may be included in a propulsion system of an automobile. The engine 10 is shown with four cylinders 30. However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. As such, the pedal position signal may indicate a tip-in (e.g., sudden increase in pedal position), a tip-out (e.g., sudden decrease in pedal position or release of the accelerator pedal), and additional driving conditions.

Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel 156 of a vehicle via an intermediate transmission system 150. Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust manifold 46 to exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30; however it will be appreciated that port injection is also possible. Fuel may be delivered to fuel injector 50 by a fuel system (not shown) including a fuel tank, a fuel pump, and a fuel rail.

Intake passage 42 may include throttle 21 having a throttle plate 22 to regulate air flow to the intake manifold. In this particular example, the position (TP) of throttle plate 22 may be varied by controller 12 to enable electronic throttle control (ETC). In this manner, throttle 21 may be operated to vary the intake air provided to combustion chamber 30 among other engine cylinders. In some embodiments, additional throttles may be present in intake passage 42, such as a throttle upstream of the compressor 60 (not shown).

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge air cooler, as described in more detail below.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12.

Further, exhaust passage 48 may include wastegate 26 for diverting exhaust gas away from turbine 62. Additionally, intake passage 42 may include a compressor bypass valve (CBV) 27 configured to divert intake air around compressor 60. Wastegate 26 and/or CBV 27 may be controlled by controller 12 to be opened when a lower boost pressure is desired, for example. For example, in response to compressor surge or a potential compressor surge event, the controller 12 may open the CBV 27 to decrease pressure at the outlet of the compressor 60. This may reduce or stop compressor surge.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger. In yet other embodiments, the CAC 80 may be a variable volume CAC. Hot charge air from the compressor 60 enters the inlet of the CAC 80, cools as it travels through the CAC, and then exits to pass through the throttle 21 and then enter the engine intake manifold 44. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. To reduce the accumulation of condensate and risk of corrosion, condensate may be collected at the bottom of the CAC, and then be purged via a hollow removal valve in the CAC (shown in FIGS. 2-4) during selected engine operating conditions, such as switching idling and throttling events. Thus, as elaborated herein with reference to FIGS. 2-6, condensate may be drained from the CAC by opening the hollow removal valve in response to a pressure change within the CAC.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40.

Other sensors that may send signals to controller 12 include a temperature and/or pressure sensor 124 at the outlet of the charge air cooler 80, and a boost pressure sensor 126. Other sensors not depicted may also be present, such as a sensor for determining the intake air velocity at the inlet of the charge air cooler, and other sensors. In some examples, storage medium read-only memory 106 may be programmed with computer readable data representing instructions executable by microprocessor unit 102 for performing the methods described below as well as other variants that are anticipated but not specifically listed. An example routine is described herein in FIG. 6.

The inventors herein have recognized that for the continuous removal of condensate without losing boosted air pressure to the environment and while maintaining a simple, dependable design, a hollow valve can be used to shuttle the condensate. In the embodiment detailed below, the single, hollow valve is one component of a valve assembly that is fitted to a side of the intercooler. The valve can remove an amount of condensate from the intercooler upon every shuttling movement, while separating the boosted air from the ambient air. The valve assembly is mounted to a side of the intercooler according to one embodiment as seen in FIG. 2.

FIG. 2 is a detailed side view of the intercooler 200 with the valve assembly 250 fitting along a bottom side of the outlet tank 220 of the intercooler. As shown, the intercooler is arranged in a vertical direction such that the condensate 260 will be gravity-fed into the valve assembly for removal. In this example intercooler design the hot compressed air 201 from the compressor of the turbocharger flows into the inlet tank 210 via an inlet passage. Then the flow is divided to travel through a number of cooling passages 215 (heat exchange passages). As the hot air travels through the passages 215, ambient air 203 is pushed through multiple ambient air passages 216 positioned adjacent and in between the cooling passages 215. As hot charge air 201 and ambient air 203 pass through their respective passages of the central cooling portion 230 of the intercooler, heat exchange occurs whereby the temperature of the hot charge air is reduced so cooler charge air 202 exits the cooling portion 230. Lastly, the cooler compressed air 202 flows out of the intercooler 200 via an outlet passage that may be coupled to a downstream engine component, such as the intake manifold.

As described previously, as the heat exchange occurs within the central portion 230, liquid may condensate out of the compressed air 201 within the cooling passages 215 and collect in a condensate layer 260 at the bottom of the outlet tank 220. The bottom surface of the outlet tank 220 may be angled such that condensate more easily flows into the valve assembly 250. Through shuttling motion actuated by the fluctuating air pressure within the intercooler 200, the condensate 260 exits to a removal conduit 270 that moves the condensate to the environment or another system, such as the vehicle exhaust. It is noted that the intercooler design of FIG. 2 may vary according to the particular engine system. For example, in a different intercooler, the orientation of the tanks may be different so the valve assembly 250 would be placed in a different position where the condensate 260 most easily flows. Additionally, it will be appreciated that the specific features of the intercooler 200 may embody configurations other than those depicted in FIG. 2 without departing from the scope of the present disclosure.

FIG. 3 shows an embodiment of the valve assembly 300, the same valve assembly 250 shown in FIG. 2. The depicted valve assembly of FIG. 3 includes an upper plate 310 that may be fastened via holes 370 to an opening in a bottom surface of an intercooler. Alternatively, the valve assembly 300 may be welded or otherwise attached. The plate 310 is connected to the top rim of a condensate collection region 320, presented here as a container or cup. The container 320 holds an amount of condensate 360, the size of the container depending on the engine system and calculated volume of charge air flowing through the intercooler. The bottom rim of the condensate collection region 320 is attached to an outlet piece 340 that can be configured to attach to an external conduit to carry condensate 360 away from the valve assembly 300. The bottom surface of the container 320 contains a centered hole sized such that a hollow valve 330 can fit and maintain a watertight seal such that condensate is held in the container.

The cylindrical, hollow valve 330 includes a top cap 331 and bottom cap 332 that define the upper and lower extremities of the valve. The top and bottom caps extend radially outward past an outer surface of the cylinder forming the central body of the valve 330. A first helical spring 333 or similar retaining device is placed between the top cap 331 and interior bottom surface of the container 320. The spring force pushes the valve 330 into a more vertical, or closed position such that the majority of the valve is projected in the container 320 on the interior side of the intercooler. A second spring 334 is placed between the bottom cap 332 and exterior bottom surface of the container 320. The second spring force pushes the valve 330 towards a less vertical, or open position such that the majority of the valve is projected in the outlet piece 340 on the exterior side of the intercooler. The spring rates and/or pre-load forces on the springs may be different, with spring 333 having a higher pre-load/rate than spring 334 such that the valve is biased into the closed position when there is no pressure difference between the inlet and outlet. However, when intake air is boosted sufficiently higher than ambient, the spring forces are overcome and the valve shuttles, as described herein. The hollow valve 330 also includes an orifice 335 through which condensate 360 can travel into a chamber 336, also inside the hollow valve. Note that the preload on the first spring 333 may be sufficiently greater to hold the valve in the more vertical, closed position even when the valve is filled with liquid, thus overcoming the additional weight of the liquid.

As shown in FIG. 3 the valve is in the closed position. In this position, condensate 360 flows into the valve cavity 336 where it remains until the valve 330 shifts to the open position such that the orifice 335 faces the region defined by the outlet piece 340, and the condensate 360 flows in a general direction defined by the arrow 361. The strengths of the springs 333 and 334 are configured such that hollow valve 330 is biased towards the closed position. For example, if the air pressure on the top 331 and bottom 332 sides of the valve was the same, the valve would remain in the closed position as shown in FIG. 3.

The valve assembly 300 may also include a heating element (not shown) for cold weather applications. The heating element may be placed on a surface of the valve assembly, one example location being around the periphery of the outer surface of the collection container 320. Being fastened and in close proximity to the container 320, the heating element would be near the condensate 360, allowing for more efficient heat transfer. In other embodiments not shown, the closeness of the heating element to the container 320 may be such that there is less distance between the heater and container 320 than the distance between the container and valve 330. Furthermore, in the present embodiment, the outer surface of the collection container 320 provides the most surface area in contact with the condensate 360, again aiding in the heat transfer between the heating element and condensate. During cold weather, such as when the outdoor air temperature is below the freezing point of water, the heating element would turn on to keep the condensate from freezing. The freezing point of the condensate may likely be close to the freezing point of normal liquid water. Without the heating element, the condensate may freeze in the valve assembly and prevent the shuttle valve from operating properly. The heating element may be necessary for the continuous operation of the shuttle valve during sub-freezing weather conditions.

It should be appreciated that the above description is non-limiting and components of the valve assembly 300 may be of other suitable geometric configurations than those depicted in FIG. 3. For example, the springs 333 and 334 may be other similar retaining devices, or the shape of the valve 330 may not be cylindrical. Other embodiments may be configured while maintaining the central concept of shuttling condensate from the intercooler with a single valve and providing no direct connection between the charge air and ambient air.

Figure 4:
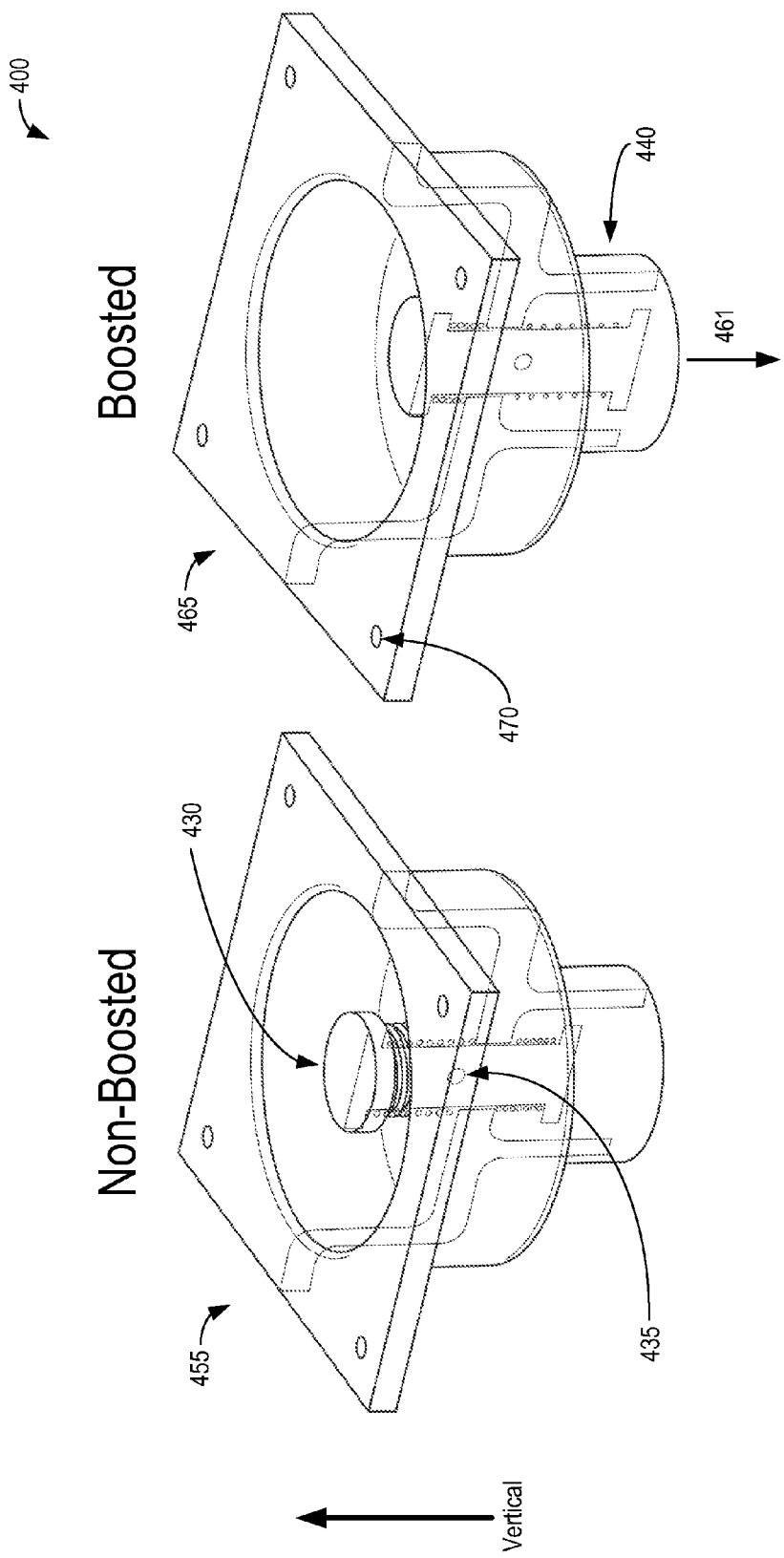
FIG. 4 illustrates the shuttling motion of the valve assembly in an angled view.

FIG. 4 illustrates the general shuttling operation 400 of the hollow valve 430. The valve assembly of FIG. 4 is the same as the valve assembly 300 of FIG. 3. Valve position 455 shows the first, or closed valve position. In this position the intercooler is in a non-boosted air pressure state, characterized by engine idling where the intercooler pressure may be lower than the pressure during throttling conditions. This position is the same as the valve position shown in FIG. 3. In the closed position, the hollow valve 430 collects gravity-fed condensate through the orifice 435. After a duration of time the engine state may switch from idling to throttling, causing a pressure increase within the intercooler, whereupon the hollow valve 430 may move from the first position 455 to a second position 465.

In the second, or open, valve position 465 the intercooler is in a boosted air pressure state, characterized by light to heavy engine throttling where the intercooler pressure may be higher than the pressure during idling conditions. In this position, the hollow valve 430 releases the condensate to an outlet 440 that may be attached to an external conduit such as pipe or other type of duct. The condensate flows out of the valve assembly in a general direction depicted by the arrow 461. This process of shuttling between the closed 455 and open 465 positions is repeated according to intercooler air pressure fluctuations.

The switch from idling to throttling (and vice versa) is determined by a pressure threshold, which is pre-determined according to the particular engine system and condensation removal requirements. When the valve moves from closed to open the force of the intercooler air pressure is large enough so as to overcome the countering (or reaction) spring forces of the valve. Conversely, when the valve moves from open to closed the force of the intercooler air pressure is less than the spring forces. The valve springs may be calibrated in order to precisely determine the pressure threshold at which the valve will move. As described previously with regard to FIG. 3, the springs are calibrated such that the hollow valve 430 is biased towards the closed position 455. Additionally, the four holes 470 may be used to bolt the valve assembly to the bottom surface of the intercooler.

It is noted that the method of valve operation described previously in relation to FIG. 4 should be regarded in a non-limiting sense. The specific steps of removing condensate from the intercooler may vary while maintaining the same general concept of shuttling condensate without allowing a continuous connection between the charge air and exterior ambient air. For example, the spring forces of the valve assembly may bias the valve towards the open position to better suit the conditions of a specific intercooler and engine system.

Figure 5:
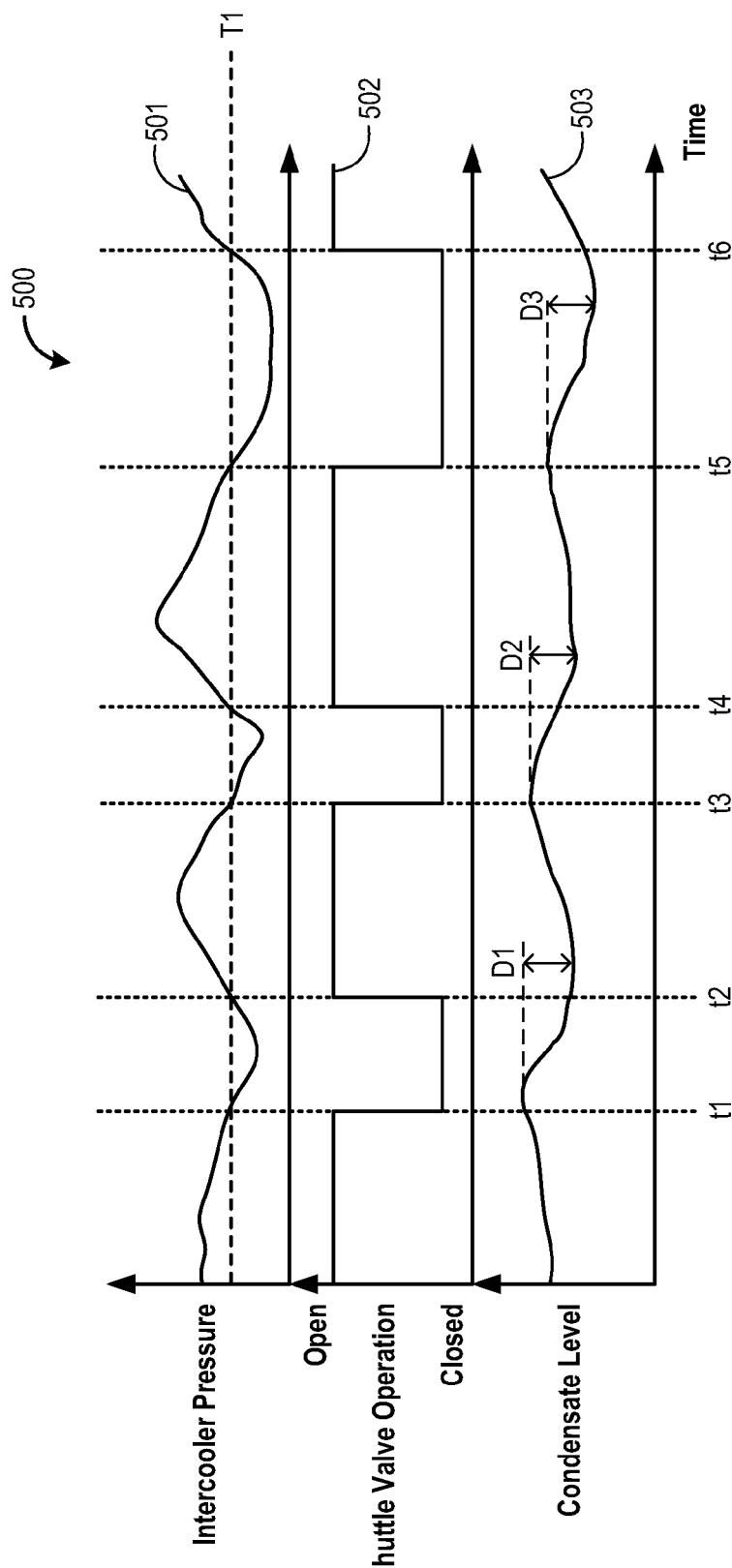
FIG. 5 shows a graph illustrating example intercooler condensate removal events by mechanically shuttling the valve, and the responsive system behaviors.

FIG. 5 shows the general operation of the shuttle valve in graphical form during a period of time of engine operation. Specifically, graph 500 shows changes in intercooler or boosted air pressure in plot 501, changes in the position of the shuttle valve in plot 502, and changes in condensate level in the intercooler in plot 503. Time is represented along the x-axis of graph 500. According to the throttling demand by the user of the vehicle, the intercooler air pressure increases and decreases as shown in plot 501. Additionally, a threshold boost pressure, T1, is shown in FIG. 5. The threshold boost pressure T1 is the pre-determined pressure at which the valve shuttles between the open and closed positions. Any pressure above the threshold T1 is characterized by a boosted air pressure state in the intercooler, and any pressure below the threshold T1 is characterized by a non-boosted air pressure state. As such, as the charge air pressure increases from below to above the threshold T1, the valve moves from the closed to open position. Conversely, as the boost pressure decreases from above to below the threshold T1, the valve moves from the open to closed position. The movement of the valve is shown in plot 502. In response to the valve movement, the condensate level in the intercooler also changes, as see in plot 503.

The sequence of events according to FIG. 5 is as follows: first, prior to time t1 the valve is in the open position, being held by a force exerted by the boosted air pressure state within the intercooler. During this time, the condensate level may increase as charge air is being cooled and releasing liquid. At time t1, the intercooler pressure decreases below the threshold T1, shifting into a non-boosted state, whereupon the shuttle valve closes due to the lower intercooler pressure. A portion of the collected condensate then flows into the cavity of the hollow valve, thereby lowering the amount of condensate in the intercooler. In this embodiment, the condensate level is measured in the collection container 320 of FIG. 3, which may be formed in the shape of a cup in one example, with a bottom of the cup parallel to a bottom surface of the charge air cooler as shown in FIG. 2. The condensate level lowers by an amount D1, which occurs throughout a short period of time. At time t2, the intercooler reaches a boosted pressure state once again and the shuttle valve opens, releasing the D1 volume of condensate into an external conduit or other component.

The described process of shifting from a boosted to a non-boosted pressure state is repeated at times t3 and t5. Similarly, the described process of shifting from a non-boosted to a boosted pressure state is repeated at times t4 and t6. Subsequent draining of condensate at times t4 and t6 corresponds to the volumes D2 and D3. It is noted that all the removal volumes D1, D2, D3 may be nearly equal due to the fixed volume of the internal cavity of the shuttle valve.

The continuous operation of the shuttle valve 330 of FIG. 3 depends on the intercooler air pressure fluctuating between a boosted and non-boosted state, the boundary of which is determined by the threshold T1 of FIG. 5, described previously. In an engine operating condition in which the threshold T1 is not reached for a period of time, the shuttle valve may remain in a single position, unable to remove condensate. During this situation, an electronic actuator may be attached to the valve assembly so as to automatically operate the valve when the intercooler pressure is nearly constant.

Figure 6:
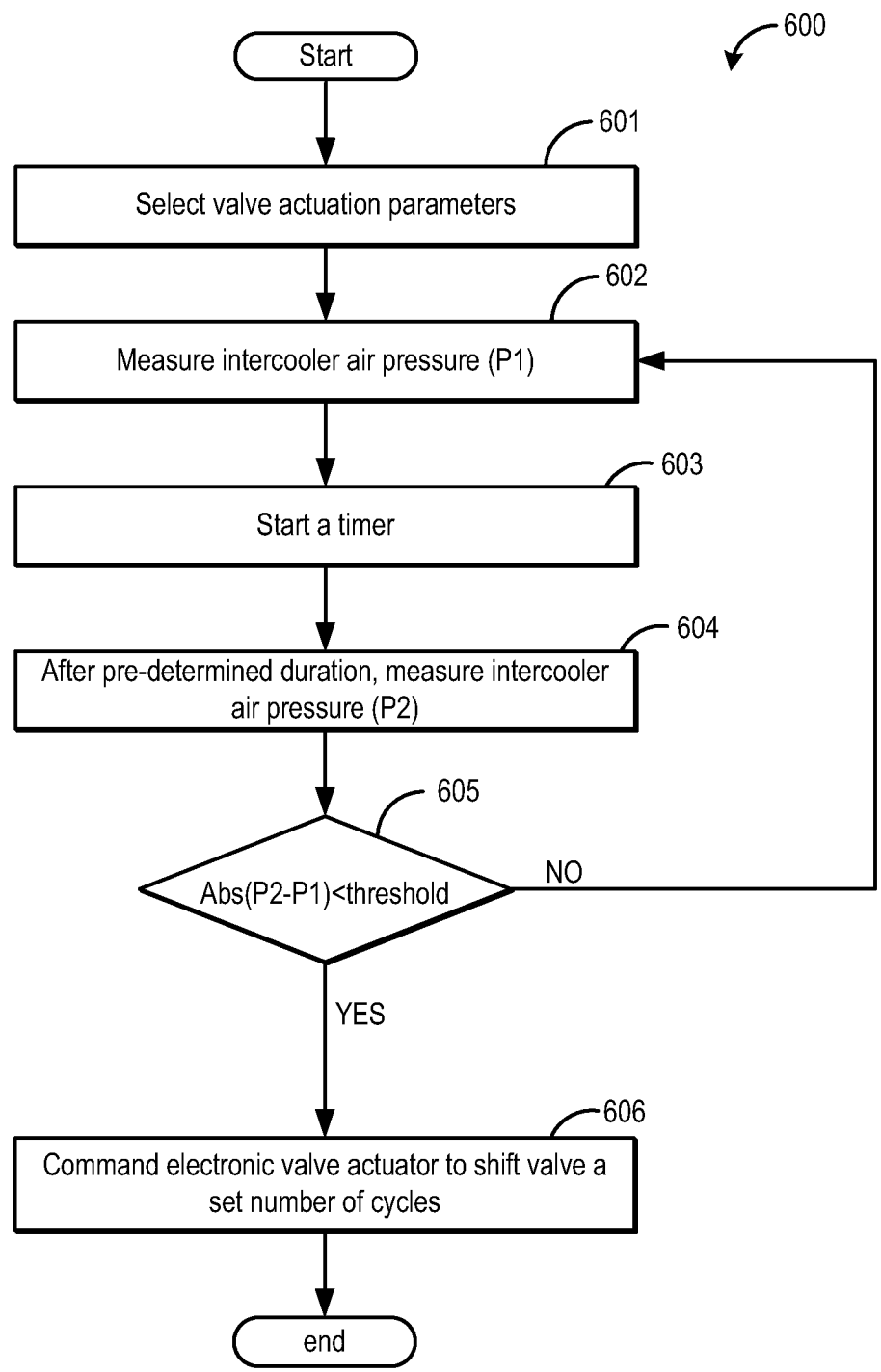
FIG. 6 shows a flow chart for the shuttle valve operation by an electronic actuator.

FIG. 6 shows a flow chart for the shuttle valve operation by an electronic actuator according to one embodiment. The electronic actuator may be an electromagnetic coil or similar device configured to move the shuttle valve between the open and closed positions. The actuator may be connected to the controller 12 such that programmed instructions are executed, as described previously. The control method 600 begins at 601 by selecting valve actuation parameters. This preliminary step may include determining a time duration, pressure difference threshold, rate of cycling, and number of cycles, as further explained below. Next, at 602, the intercooler air pressure magnitude is measured and recorded as a first value P1. The pressure may be measured by a sensor positioned within the intercooler or outside of it, such as the sensors 124 and 126. The sensor may also be connected to the controller 12 to provide pressure data for the execution of the control method 600.

Once the first pressure P1 is recorded, a timer is started at 603. The timer is activated for a set duration before executing step 604. The time duration, mentioned above, may be determined by the engine system and factors including the rate of pressure fluctuation in the intercooler, the size of the intercooler, average rate of condensation formation, and duration of throttling/idling. Once the set time duration has elapsed, the intercooler air pressure magnitude is measured and recorded again as P2. Next, at 605, if the absolute difference between the two recorded pressures P1 and P2 is above a threshold (different from threshold T1), the valve is likely functioning as normal and the process is repeated. Conversely, if the absolute pressure difference is below a threshold, then the valve may not be shuttling as normal. In this case, at 606, the controller 12 commands the electronic actuator to cycle the valve a set number of times. The number may depend on similar conditions as those described for the time duration. The electronic cycling of the valve allows for accumulated condensation to be removed during constant intercooler air pressure conditions when the valve may not be mechanically activated.

In the control method shown in FIG. 6, the time duration between measuring pressures P1 and P2 may be a carefully-selected factor. In one extreme situation, the time duration may be long such that the valve is operating as normal but due to the long time duration, the difference between pressures may be small enough so as to electronically activate the valve. In another extreme situation, the time duration may be short such that the pressure is fluctuating but the difference between pressures remains below the threshold, causing the electronic actuator to activate. To implement the method of FIG. 6, the valve actuation parameters should be dynamically selected at 601 so as to conform to the specific engine configuration and engine conditions.

It is noted that the control scheme of the electronic actuator can be implemented in a number of ways. The example shown in FIG. 6 is one way of electrically operating the valve, where movement is determined by a difference between pressures P1 and P2. Other methods for triggering valve movement may include monitoring the level of condensate in the collection container 320 or in the intercooler itself, or recording the rate of valve shuttling such that the valve is activated to maintain a pre-determined rate. The flow chart of FIG. 6 is meant to provide a general understanding of one way to maintain condensate removal during near-constant intercooler pressure that temporarily inhibits manual operation of the valve.

From the above descriptions and associated figures, an engine method is provided, comprising: operating an intercooler to decrease the temperature of intake air, the intercooler comprising an interior side and an exterior side; opening a hollow valve located on a bottom surface of the intercooler to remove condensate from the intercooler to the exterior side in response to a boosted intercooler pressure state; closing the hollow valve to collect condensate in response to a non-boosted intercooler pressure state; and during engine operating conditions when a switch between the boosted and non-boosted intercooler pressure states does not occur for a period of time, commanding an electronic actuator to open and close the hollow valve.

By using the valve assembly of FIG. 3 according to the method of FIG. 4, condensate may be removed from the intercooler while never providing a direct fluidic connection between the intercooler boosted air and the exterior environment (or ambient air). Furthermore, the use of a single shuttle valve reduces the complexity of the condensate removal system and method, which may increase the reliability of the described shuttle valve assembly. Combined with a heating element and electronic actuator for near-constant boosted air pressure, the shuttle valve may continuously remove condensate from the intercooler without releasing large quantities of compressed air. Overall, this condensate removal method and system improves intercooler and engine operation by purging condensate while maintaining charge air pressure.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
   collecting condensate from an intercooler into a collection region;
   moving the condensate through an orifice into a cavity of a hollow valve in a first position;
   shuttling the hollow valve to a second position to release the condensate to an exterior side of the intercooler, wherein shuttling includes the hollow valve moving linearly through a cavity in a bottom side of the collection region, and
   continuously removing the condensate from the intercooler via cycles relative to a predetermined pressure threshold, wherein a fixed volume of condensate is shuttled from the collection region via the hollow valve during each cycle.

2. The engine method of claim 1, wherein the exterior side is in open communication with ambient pressure, wherein there is no direct fluidic connection between compressed air in the intercooler and ambient air located on the exterior side of the intercooler.

3. The engine method of claim 1, wherein the first position is a more vertical position.

4. The engine method of claim 1, wherein the second position is a less vertical position.

5. The engine method of claim 1, wherein the condensate travels into the hollow valve via the orifice before being shuttled to the exterior side of the intercooler to be released, the condensate driven at least partially via gravity in both cases.

6. The engine method of claim 1, wherein the movement of the hollow valve is actuated by a magnitude of compressed air pressure in the intercooler being less or greater than a reaction force maintained by the hollow valve, the magnitude of compressed air pressure corresponding to a boosted or non-boosted intercooler pressure state.

7. The engine method of claim 6, wherein the non-boosted pressure state includes an engine idling condition causing a decrease in air pressure within the intercooler.

8. The engine method of claim 6, wherein the boosted pressure state includes an increase in air pressure within the intercooler greater than ambient pressure.

9. The engine method of claim 7, wherein upon achieving the non-boosted pressure state in the intercooler, the hollow valve moves to the first position, the first position being where the hollow valve is projecting into the intercooler, allowing condensate to flow into the cavity of the hollow valve via the orifice.

10. The engine method of claim 8, wherein upon achieving the boosted pressure state in the intercooler, the hollow valve moves to the second position, the second position being where the hollow valve is projecting into the exterior side of the intercooler, allowing condensate to flow out of the cavity of the hollow valve via the orifice.

11. A valve assembly located in an intercooler of an engine, comprising:
   a moveable, hollow valve comprising a main body and two caps, the two caps located on a top and a bottom of the main body;

a condensate collection container surrounding the valve, the valve only partially protruding through a bottom of the collection container;

a first spring positioned between the top cap and a first side of a lower surface of the collection container;

a second spring positioned between the bottom cap and a second, opposite side of the lower surface of the collection container, wherein the first spring and the second spring are positioned in between the top cap and the bottom cap; and the hollow valve further comprising an internal chamber for condensate collection coupled to an orifice through which condensate travels, wherein at a first position, the first spring pushes the hollow valve such that a majority of the hollow valve is in the collection container to collect condensate, and wherein at a second position, the second spring pushes the hollow valve such that the majority of the hollow valve is projected on an exterior side of the intercooler to drain condensate.

12. The valve assembly of claim 11, wherein the hollow valve is located at a center of the collection container.

13. The valve assembly of claim 11, wherein the condensate collection container is mounted to a bottom surface of the intercooler.

14. The valve assembly of claim 11, wherein the hollow valve is a pressure-activated mechanical valve.

15. The valve assembly of claim 11, further comprising a heating element in close proximity to the condensate collection container.

16. An engine system, comprising:
a turbocharger;
an intake manifold;
an intercooler coupled upstream of the intake manifold and downstream of a compressor of the turbocharger;
a valve assembly attached to a bottom surface of the intercooler, comprising a hollow valve to control a discharge of condensate from the intercooler, wherein the hollow valve fills with condensate in a closed position and drains condensate in an open position; and
a control unit with computer readable instructions for operating the hollow valve during an engine condition, wherein the valve assembly operates to continuously remove condensate without forming a direct fluidic communication between compressed air in the intercooler and exterior ambient air.

17. The engine system of claim 16, wherein moving the hollow valve removes condensate from the intercooler to an exterior side of the intercooler.

18. The engine system of claim 16, wherein the engine condition includes prolonged throttling greater than a threshold or idling where intercooler pressure does not substantially vary such that the hollow valve does not shift to remove condensate.

19. The engine system of claim 18, further comprising an electronic actuator attached to the valve assembly, where the electronic actuator operates the valve assembly when the intercooler pressure is nearly constant.

* * * * *